(12) United States Patent
Sashida

(10) Patent No.: US 12,335,634 B2
(45) Date of Patent: Jun. 17, 2025

(54) IMAGING APPARATUS, IMAGING CONTROL METHOD AND STORAGE MEDIUM

(71) Applicant: CASIO COMPUTER CO., LTD., Tokyo (JP)

(72) Inventor: Kenzo Sashida, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 136 days.

(21) Appl. No.: 18/185,883

(22) Filed: Mar. 17, 2023

(65) Prior Publication Data

US 2023/0328392 A1    Oct. 12, 2023

(30) Foreign Application Priority Data

Mar. 18, 2022   (JP) ................. 2022-044505

(51) Int. Cl.
*H04N 23/74* (2023.01)
*H04N 23/56* (2023.01)
(Continued)

(52) U.S. Cl.
CPC ............. *H04N 23/75* (2023.01); *H04N 23/56* (2023.01); *H04N 23/74* (2023.01); *H04N 23/62* (2023.01); *H04N 23/671* (2023.01); *H04N 25/133* (2023.01)

(58) Field of Classification Search
CPC ....... H04N 23/67; H04N 23/74; A61B 1/0638
(Continued)

(56) References Cited

U.S. PATENT DOCUMENTS 7,711,252 B2    5/2010   Konno et al.
7,826,728 B2   11/2010   Konno et al.
(Continued)

FOREIGN PATENT DOCUMENTS

JP    2013088676 A    5/2013
JP    2018202006 A   12/2018
(Continued)

OTHER PUBLICATIONS

Extended European Search report dated Nov. 27, 2023 received in European Patent Application No. EP 23161817.4.
(Continued)

*Primary Examiner* — Anthony J Daniels
(74) *Attorney, Agent, or Firm* — Scully, Scott, Murphy & Presser, P.C.

(57) ABSTRACT

In "normal" image capturing, a focal position of an imaging lens group with respect to a photographic subject irradiated with light by a light source is specified as an imaging focal position. In "green" image capturing, a focal position of the imaging lens group with respect to the subject irradiated with green light by a light source is identified. When the focal position for "green" image capturing is within a first range, this focal position is specified as an imaging focal position. When this focal position is not within the first range, an imaging focal position for "green" image capturing is specified based on the focal position for the "normal" image capturing, and the subject which is being irradiated with green light is photographed by an image sensor with the focus lens being set at the imaging focal position for "green" image capturing.

20 Claims, 11 Drawing Sheets

(51) Int. Cl.
H04N 23/67 (2023.01)
H04N 23/75 (2023.01)
H04N 23/62 (2023.01)
H04N 25/133 (2023.01)

(58) Field of Classification Search
USPC .......................................................... 348/345
See application file for complete search history.

(56) References Cited

U.S. PATENT DOCUMENTS

| | | | |
|---|---|---|---|
| 10,200,604 | B2 | 2/2019 | Tatsuta et al. |
| 10,564,408 | B2 | 2/2020 | Vartiainen et al. |
| 11,405,561 | B2 | 8/2022 | Houjou et al. |
| 2006/0251408 | A1 | 11/2006 | Konno et al. |
| 2008/0259336 | A1 | 10/2008 | Konno et al. |
| 2008/0284902 | A1 | 11/2008 | Konno et al. |
| 2008/0292295 | A1 | 11/2008 | Konno et al. |
| 2017/0085789 | A1* | 3/2017 | Tatsuta ................. G02B 21/241 |
| 2018/0321481 | A1 | 11/2018 | Vartiainen et al. |
| 2019/0132508 | A1* | 5/2019 | Hamano ............... H04N 23/667 |
| 2020/0337540 | A1* | 10/2020 | Takekoshi ................ G02B 7/36 |
| 2021/0290036 | A1* | 9/2021 | Segawa ................ A61B 1/0661 |
| 2022/0345608 | A1* | 10/2022 | Ikeda .................... H04N 23/56 |

FOREIGN PATENT DOCUMENTS

| | | |
|---|---|---|
| JP | 2019217179 A | 12/2019 |
| JP | 2021144244 A | 9/2021 |
| JP | 2021148886 A | 9/2021 |
| JP | 7000933 B2 | 1/2022 |
| WO | 2005071372 A1 | 8/2005 |
| WO | 2019087557 A1 | 5/2019 |

OTHER PUBLICATIONS

Notice of Reasons for Refusal dated Jul. 30, 2024 received in Japanese Patent Application No. 2022-044505.

* cited by examiner

IMAGING APPARATUS, IMAGING CONTROL METHOD AND STORAGE MEDIUM

CROSS-REFERENCE TO RELATED APPLICATION

This application is based upon and claims the benefit of priority from the prior Japanese Patent Application No. 2022-044505, filed Mar. 18, 2022, the entire contents of which are incorporated herein by reference.

BACKGROUND OF THE INVENTION

1. Field of the Invention

The present invention relates to an imaging apparatus, an imaging control method and a storage medium.

2. Description of the Related Art

Imaging apparatuses (colposcope cameras) are known which are used to observe a uterine cervix, perform image capturing thereof, and analyze captured images (visualize diseases) mainly in departments of obstetrics and gynecology. For example, Japanese Laid-Open (Kokai) Patent Application No. 2021-148886 discloses a technique by which an imaging apparatus performs, in addition to "normal" image capturing with visible light, consecutive image capturing (continuous shooting) while radiating special light so as to more closely observe the condition (blood vessels and nerves) of an affected part.

SUMMARY OF THE INVENTION

In accordance with one aspect of the present invention, there is provided an imaging control method wherein at least one processor of an imaging control apparatus: specifies a first focal position of an optical system with respect to a photographic subject which is irradiated with first irradiation light; specifies a second focal position of the optical system with respect to the photographic subject which is irradiated with second irradiation light having characteristics different from characteristics of the first irradiation light; judges whether or not a first condition based on the first focal position and the second focal position is satisfied; sets an imaging focal position based on the second focal position in a case in which the first condition is satisfied, and sets an imaging focal position based on the first focal position in a case in which the first condition is not satisfied; and acquires an image of the photographic subject irradiated with the second irradiation light, which is captured by an image sensor with the optical system set at the imaging focal position.

In accordance with another aspect of the present invention, there is provided an imaging control method wherein at least one processor of an imaging control apparatus: specifies a first focal position of an optical system with respect to a photographic subject which is irradiated with first irradiation light; specifies a second focal position of the optical system with respect to the photographic subject which is irradiated with second irradiation light having characteristics different from characteristics of the first irradiation light; judges whether or not a first condition based on the first focal position and the second focal position is satisfied; sets an imaging focal position based on the second focal position in a case in which the first condition is satisfied, and sets an imaging focal position based on the first focal position in a case in which the first condition is not been satisfied; acquires an image of the photographic subject irradiated with the second irradiation light, which is captured by an image sensor with the optical system set at the imaging focal position; specifies a third focal position of the optical system with respect to the photographic subject which is irradiated with third irradiation light having characteristics different from characteristics of the first irradiation light and the second irradiation light; judges whether or not a second condition based on the first focal position and the third focal position is satisfied; sets an imaging focal position based on the third focal position in a case in which the second condition is satisfied, and sets an imaging focal position based on the first focal position in a case in which the second condition is not satisfied; and acquires an image of the photographic subject irradiated with the third irradiation light, which is captured by the image sensor with the optical system set at the imaging focal position.

In accordance with another aspect of the present invention, there is provided a non-transitory computer-readable storage medium having stored thereon a program that is executable by a computer to actualize functions comprising: specifying a first focal position of an optical system with respect to a photographic subject which is irradiated with first irradiation light; specifying a second focal position of the optical system with respect to the photographic subject which is irradiated with second irradiation light having characteristics different from characteristics of the first irradiation light; judging whether or not a first condition based on the first focal position and the second focal position is satisfied; setting an imaging focal position based on the second focal position in a case in which the first condition is satisfied, and setting an imaging focal position based on the first focal position in a case in which the first condition is not satisfied; and acquiring an image of the photographic subject irradiated with the second irradiation light, which is captured by an image sensor with the optical system set at the second imaging focal position.

In accordance with another aspect of the present invention, there is provided a non-transitory computer-readable storage medium having stored thereon a program that is executable by a computer to actualize functions comprising: specifying a first focal position of an optical system with respect to a photographic subject which is irradiated with first irradiation light; specifying a second focal position of the optical system with respect to the photographic subject which is irradiated with second irradiation light having characteristics different from characteristics of the first irradiation light; judging whether or not a first condition based on the first focal position and the second focal position is satisfied; setting an imaging focal position based on the second focal position in a case in which the first condition is satisfied, and setting an imaging focal position based on the first focal position in a case in which the first condition is not satisfied; acquiring an image of the photographic subject irradiated with the second irradiation light, which is captured by an image sensor with the optical system set at the second imaging focal position; specifying a third focal position of the optical system with respect to the photographic subject which is irradiated with third irradiation light having characteristics different from characteristics of the first irradiation light and the second irradiation light; judging whether or not a second condition based on the first focal position and the third focal position is satisfied; setting an imaging focal position base on the third focal position in a case in which the second condition is satisfied, and setting an imaging focal position based on the first focal position in a case in which the second condition is not satisfied; and acquiring an image of the photographic subject irradiated with the third irradiation light, which is captured by the image sensor with the optical system set at the imaging focal position.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

A. Embodiment

Figure 1:
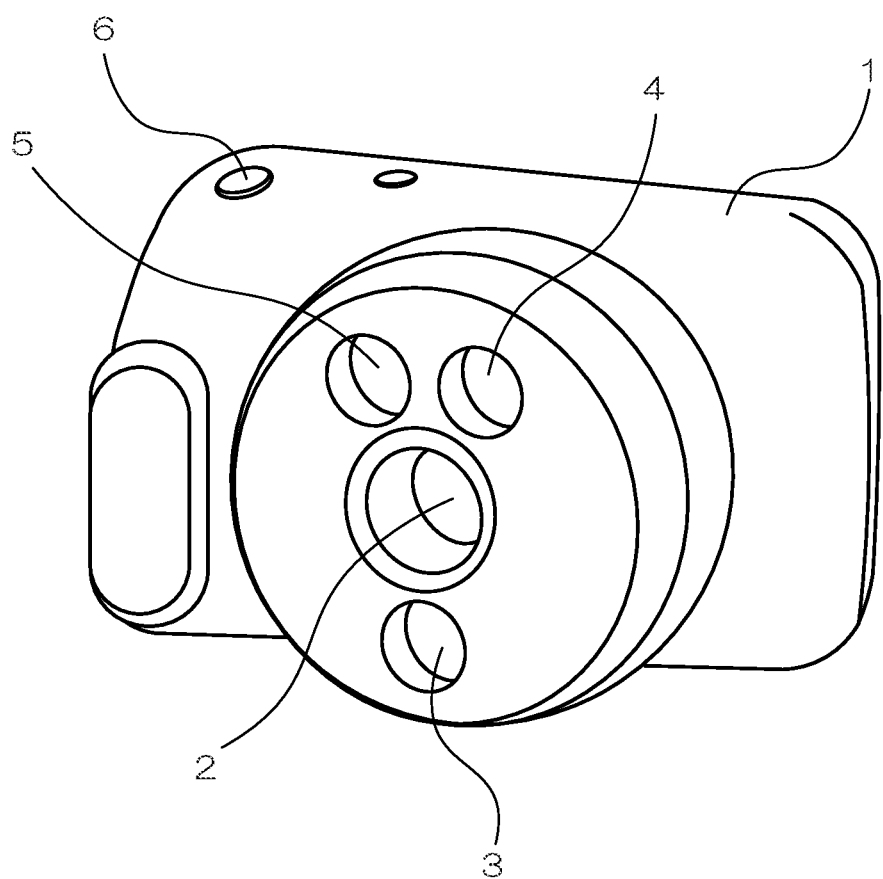
FIG. 1 is a perspective view showing the outer structure of an imaging apparatus according to the present embodiment.

A preferred embodiment of the present invention will hereinafter be described with reference to the drawings. Note that, although the embodiment described below is provided with various technically preferable limitations in order to carry out the present invention, these limitations are not intended to limit the scope of the present invention to the embodiment and an example shown in the drawings.

FIG. 1 is a perspective view showing the outer structure of an imaging apparatus 1 according to the present embodiment. This imaging apparatus 1 is capable of photographing a photographic subject while irradiating the photographic subject with three types of lights, "normal", "green", and "polarization". The photographic subject herein is, for example, the uterine cervix of a subject. Image capturing by the imaging apparatus 1 is performed with, for example, the imaging apparatus 1 being supported by a stand (not shown in the drawings), and the uterine cervix is photographed through a cylindrical speculum (not shown in the drawings) inserted into the vagina of the subject. In the center of the lens-barrel of the imaging apparatus 1, an imaging lens group 2 (optical system) for image capturing is arranged. In areas around the imaging lens group 2, a light source 3 for "normal" image capturing, a light source 4 for "green" image capturing, and a light source 5 for "polarization" image capturing are arranged. On the upper part of the imaging apparatus 1, a shutter release button (operation section) 6 is arranged.

In "normal" image capturing in the present embodiment, a photographic subject is photographed with it being irradiated with common white light by the light source 3. In "green" image capturing, a photographic subject (uterine cervix) is photographed with it being irradiated with green light (such as light whose wave length is within a range of 500 nm to 570 nm) from the light source 4 having a green filter in order to acquire an blood vessel weighted image of the photographic subject (uterine cervix). In "polarization" image capturing, in order to eliminate surface reflection (light reflection) that occurs when a photographic subject is moist, the photographic subject is photographed with it being irradiated with polarized white light from the light source 5 having a polarizing filter. By one imaging operation (one full-depression operation on the shutter release button 6) being performed, the imaging apparatus 1 automatically and sequentially performs three types of image capturing operations (continuous shooting) including "normal" image capturing, "green" image capturing, and "polarization" image capturing while performing autofocus control that sets a focal position for each image capturing. The focal position herein is the position of each lens of the imaging lens group 2 which has been adjusted so that the focal point of light reflected from a photographic subject through the imaging lens group 2 is located at an image sensor 12 described later.

Figure 2:
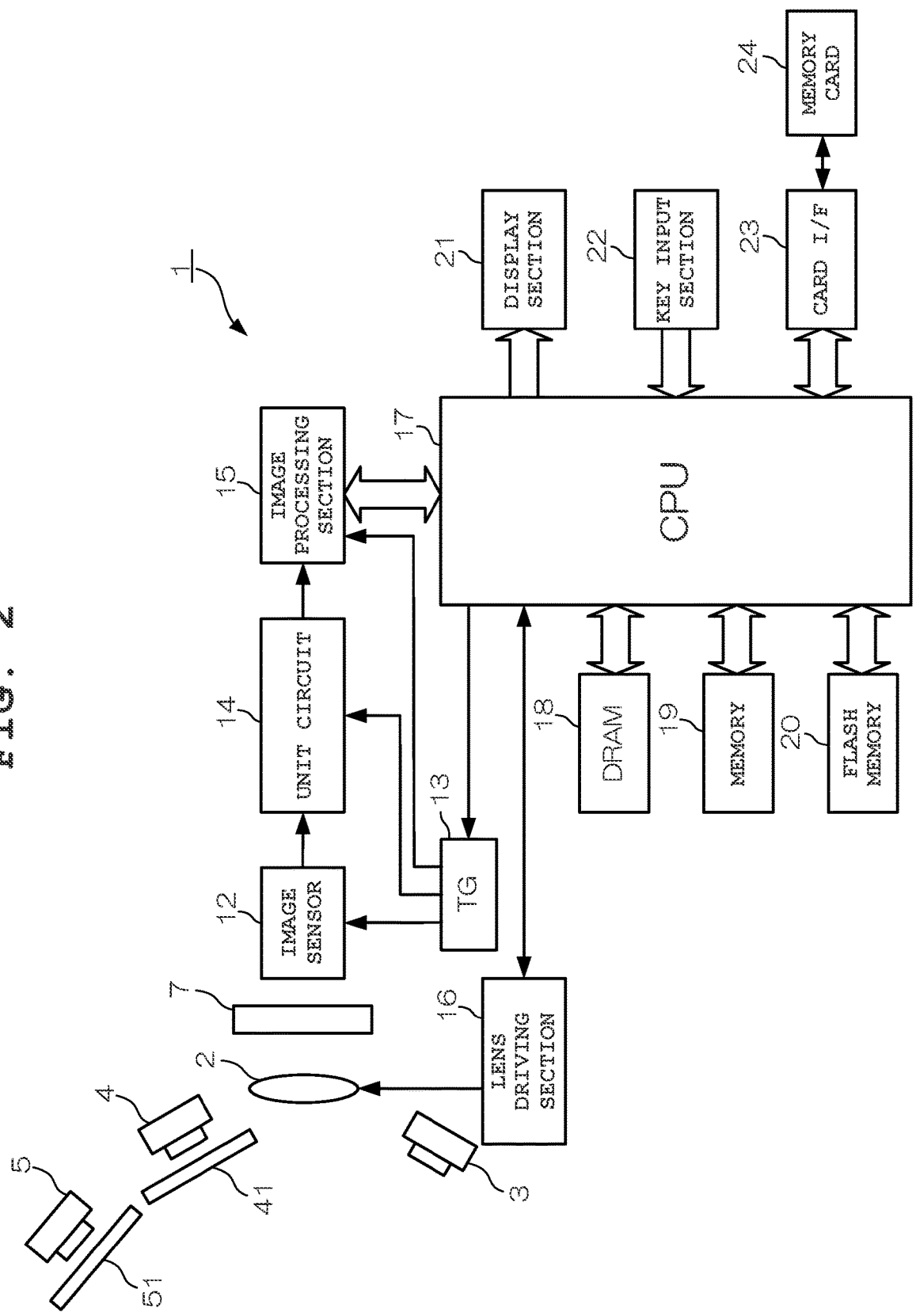
FIG. 2 is a block diagram showing the structure of the imaging apparatus according to the present embodiment.
Figure 3:
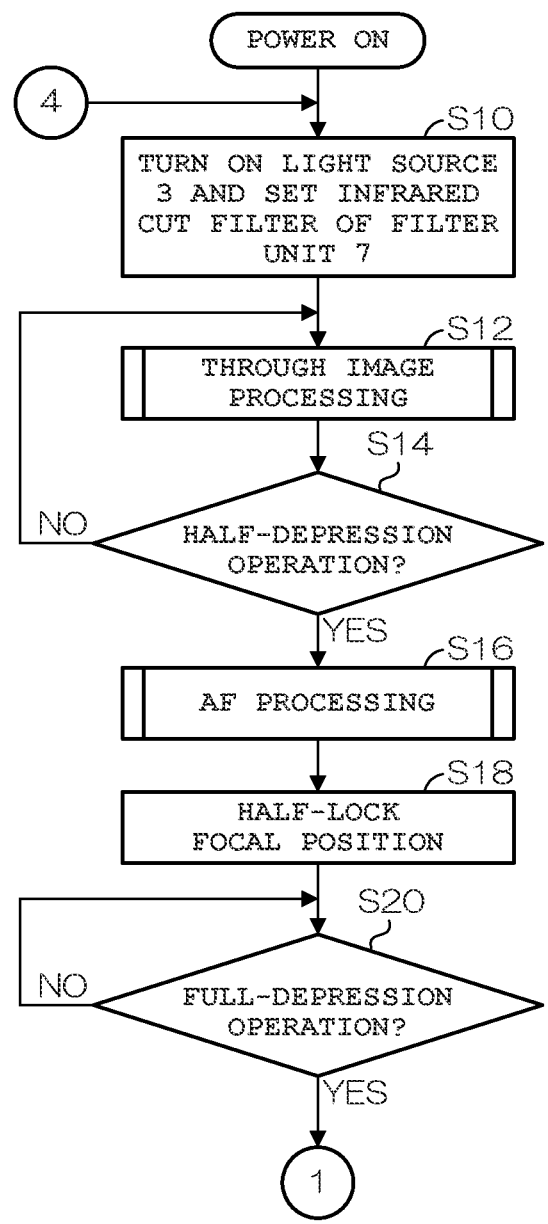
FIG. 3 is a flowchart for describing imaging operations (consecutive image capturing) by the imaging apparatus according to the present embodiment.

FIG. 2 is a block diagram showing the structure of the imaging apparatus 1 according to the present embodiment. In FIG. 2, the imaging apparatus 1 includes an imaging lens group 2, a light source 3, a light source 4 having a green filter 41, a light source 5 having a polarizing filter 51, a filter unit 7, an image sensor 12, a TG (Timing Generator) 13, a unit circuit 14, an image processing section 15, a lens driving section 16, a CPU (Central Processing Unit) 17 (processing section), a DRAM (Dynamic Random Access Memory) 18, a memory 19, a flash memory 20, a display section 21, a key input section 22, a card I/F (interface) 23, and a memory card 24.

The imaging lens group 2 includes a zoom lens and a focus lens, and each lens is movable along the optical axis. In areas around this imaging lens group 2, the light source 3 for "normal" image capturing, the light source 4 for "green" image capturing, and the light source 5 for "polarization" image capturing are arranged, as shown in FIG. 1. Each of these light sources 3, 4, and 5 includes an LED (Light Emitting Diode) that emits common white light (visible light). The light source 3 has no light filter. On the other hand, the light source 4 has the green filter 41 provided on its front, and the light source 5 has the polarizing filter 51 provided on its front. Therefore, irradiation light from the light source 3 is applied to a photographic subject with it being maintained as white light, irradiation light from the light source 4 is applied to a photographic subject as green light through the green filter 41, and irradiation light from the light source 5 is applied to a photographic subject as polarized light through the polarizing filter 51. In each of the three types of image capturing operations including "normal" image capturing, "green" image capturing, and "polarization" image capturing described above, the imaging lens group 2 takes light reflected from a photographic subject. The filter unit 7, which is arranged between the imaging lens group 2 and the image sensor 12, includes an infrared cut filter and a polarizing filter, and is structured such that the infrared cut filter and the polarizing filter can be independently positioned on or moved out of the optical axis of the imaging lens group 2 between this imaging lens group 2 and the image sensor 12. In "normal" image capturing and "green" image capturing, the infrared cut filter is positioned on the optical axis. Also, in "polarization" image capturing, the infrared cut filter and the polarizing filter are positioned on the optical axis while overlapping with each other. This filter unit 7 has the same structure as that described in Japanese Patent No. 7000933 (also published as U.S. Pat. No. 11,405,561 B2, and therefore details thereof are omitted. Note that, although the filters of a filter unit in Japanese Patent No. 7000933 are positioned on or moved out of an optical axis by being rotated, the filters of the present embodiment may be structured to be positioned on or moved out of the optical axis by being slid.

The lens driving section 16 includes a pulse motor. By controlling the driving of the pulse motor in accordance with control signals from the CPU 17, the lens driving section 16 performs autofocus processing in which the imaging lens group 2 (focus lens) is driven so as to adjust a focal position (the position of the imaging lens group 2). The image sensor (a CMOS (Complementary Metal-Oxide Semiconductor), a CCD (Charge-Coupled Device), and the like) 12, which has an electronic shutter function, converts the light of a photographic subject projected through the imaging lens group 2 into an electrical signal, and outputs it to the unit circuit 14 as an imaging signal. This image sensor 12 is driven in accordance with a timing signal generated by the TG 13 constituted by circuits.

The unit circuit 14 is constituted by a CDS (Correlated Double Sampling) circuit which performs correlated double sampling on an imaging signal outputted from the image sensor 12 and maintains it, an AGC (Automatic Gain Control) circuit which performs automatic gain control on the imaging signal after the sampling, and an A/D (Analog-to-Digital) converter which converts the analog imaging signal after the automatic gain control into a digital signal. This unit circuit 14 is driven in accordance with a timing signal generated by the TG 13, and imaging signals from the image sensor 12 are transmitted as digital signals to the image processing section 15 through this unit circuit 14.

The image processing section 15, which includes circuits, performs image processing (such as pixel interpolation processing, γ correction, generation of a luminance color difference signal, white balance processing, exposure correction processing, superimposition and conversion processing, filtering processing, and face detection processing) on image data sent from the unit circuit 14, performs compression and decompression processing on image data (such as compression and decompression of JPEG, M-JPEG or MPEG data), performs trimming of a captured image, or performs digital zooming on a captured image. This image processing section 15 is driven in accordance with a timing signal generated by the TG 13. Note that the functions of this image processing section 15 may be actualized the CPU 17 described below.

The CPU 17 is a one-chip microcomputer which controls each section of the imaging apparatus 1. In particular, in the present embodiment, the CPU 17 performs the operations described below by one imaging operation (a full-depression operation on the shutter release button 6) being performed. First, as "normal" image capturing, the CPU 17 sets the infrared cut filter of the filter unit 7 on the optical axis, and controls the lens driving section 16 so as to search for a focal position while emitting white light from the light source 3. Then, after determining a focal position for image capturing on the basis of the search result, the CPU 17 acquires an image (first captured image) captured by "normal" image capturing by the image sensor 12 with the focus lens being set at the determined focal position. After the "normal" image capturing described above, as "green" image capturing, the CPU 17 sets the infrared cut filter of the filter unit 7 on the optical axis, and controls the lens driving section 16 so as to search for a focal position while emitting green light from the light source 4 through the green filter 41. Then, after determining a focal position for image capturing on the basis of the search result, the CPU 17 acquires an image (second captured image) captured by "green" image capturing by the image sensor 12 with the focus lens being set at the determined focal position. After the "green" image capturing described above, as "polarization" image capturing, the CPU 17 sets the infrared cut filter and polarizing filter of the filter unit 7 on the optical axis such that the filters overlap with each other, and controls the lens driving section 16 so as to search for a focal position while emitting polarized light from the light source 5 through the polarizing filter 51. Then, after determining a focal position for image capturing on the basis of the search result, the CPU 17 acquires an image (second or third captured image) captured by "polarization" image capturing by the image sensor 12 with the focus lens being set at the determined focal position.

In this series of imaging operations in the present embodiment, a focal position in "green" image capturing and/or a focal position in "polarization" image capturing are corrected with reference to a focal position in "normal" image capturing. This is because fluctuations in focal positions are smallest and focal position accuracy is highest in "normal" image capturing, that is, the least defocused images can be acquired in "normal" image capturing, whereas fluctuations in focal positions are relatively large and focal position accuracy is relatively low in "green" image capturing and "polarization" image capturing due to the characteristics of the optical filter and the like even under the same imaging condition (subject distance, F value, etc.) as that of "normal" image capturing, that is, out-of-focus is more likely to occur in "green" image capturing and "polarization" image capturing.

In particular, "polarization" image capturing is known as image capturing in which fluctuations in focal positions are large and the accuracy of focal positions is relatively low as compared to "green" image capturing. When correcting a focal position in "polarization" image capturing on the basis of a focal position in "normal" image capturing, the CPU 17 corrects the focal position in consideration of the unique difference (an error resulting from a change in an optical path length by the polarizing filter and the like) of the focal position accompanying the "polarization" image capturing. By this configuration in which, in "polarization" image capturing, a focal position is corrected on the basis of a focal position in "normal" image capturing and the unique difference of the focal position accompanying the "polarization" image capturing, a more accurate focal position can be specified, which reduces defocusing. Note that the unique difference herein is an error which notably occurs when the polarizing filter of the filter unit 7 is used, and details thereof are described later.

The DRAM 18 is used as a buffer memory that temporarily stores image data captured by the image sensor 12 and transmitted to the CPU 17 via the unit circuit 14 and the image processing section 15, and is also used as a working memory for the CPU 17. The CPU 17 controls to perform the above-described processing on captured images stored in this DRAM 18. The memory 19 has stored therein a program required to control each section of the imaging apparatus 1 by the CPU 17 and data required to control these sections, and the CPU 17 performs processing in accordance with this program. The flash memory 20 and the memory card 24 are storage media that store image data acquired by the image sensor 12, and the like.

The display section 21 includes a color liquid crystal display and its drive circuit and, in an imaging standby state, displays captured images based on the above-described image data as live view images. When replaying recorded images, this display section 21 displays recorded images read out from the flash memory 20 and the memory card 24 and expanded. Also, this display section 21 displays the number of images captured up to a current point during image capturing, and displays a remaining battery level, available memory, and current imaging conditions (settings). The key input section 22 includes the shutter release 6, an imaging mode setting dial, and operation keys such as a zoom switch, a SET key, and a cross key, and outputs operation signals in accordance with key operations by the user to the CPU 17. The card I/F 23 has the memory card 24 detachably attached thereto through a card slot not shown in the drawings.

B. Operation of Embodiment

FIG. 3 to FIG. 6 are flowcharts for describing imaging operations (consecutive image capturing) by the imaging apparatus according to the present embodiment. When the power of the imaging apparatus 1 is turned on in response to the user's operation performed on the power button, the CPU 17 turns on the light source 3, and sets the infrared cut filter of the filter unit 7 on the optical axis (Step S10). Then, the CPU 17 performs through image processing (Step S12). In this through image processing, images captured by the image sensor 12 via the imaging lens group 2 are processed by the unit circuit 14 and the image processing section 15, and displayed on the display section 21 in real time. During this display, the CPU 17 judges whether or not the shutter release button 6 has been half-depressed (half depression) by the user (Step S14). When judged that no half-depression operation has been performed (NO at Step S14), the CPU continues the through image processing.

Conversely, when judged that the shutter release button 6 has been half-depressed (half depression) by the user, the CPU 17 performs autofocus (AF) processing by the lens driving section 16, or more specifically, performs processing in which the lens driving section 16 is controlled to search for a focal position, and a focal position for image capturing is determined on the basis of this search result (Step S16). Subsequently, the CPU 17 half-fixes (half-locks) the determined focal position (Step S18). Then, the CPU 17 judges whether or not the shutter release button 6 has been fully depressed (full depression) (Step S20). When judged that no full-depression operation has been performed (NO at Step S20), the CPU 17 repeats Step S20, whereby the half-fixed state of the focal position is maintained. Note that, when the half-depression operation is cancelled, the CPU 17 may return to Step S12.

<"Normal" Image Capturing>

Figure 4:
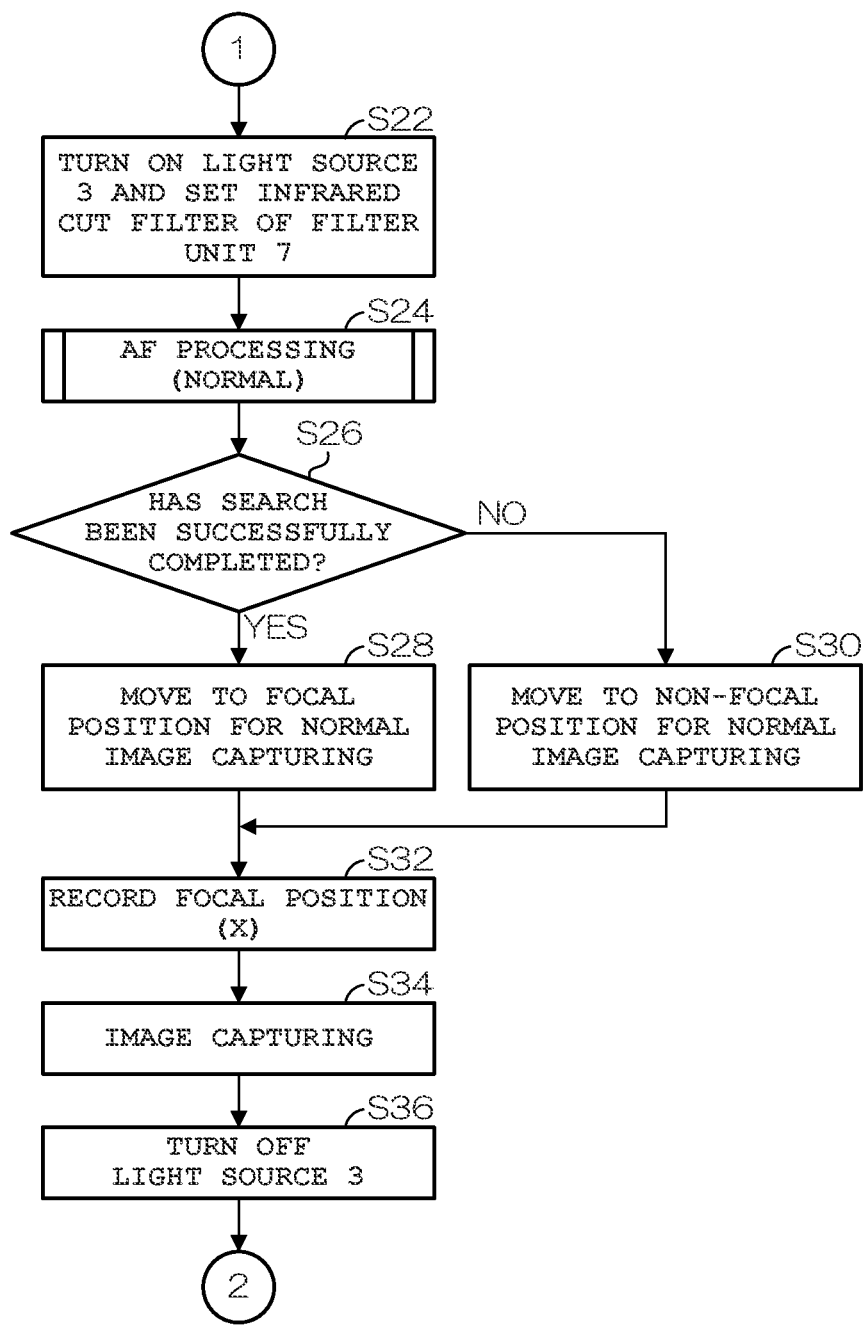
FIG. 4 is another flowchart for describing the imaging operations (consecutive image capturing) by the imaging apparatus according to the present embodiment.

Conversely, when a full-depression operation is performed subsequent to the half-depression operation (YES at Step S20), the CPU 17 turns on the light source 3 that emits white light, and sets the infrared cut filter of the filter unit 7 on the optical axis (Step S22 at FIG. 4). Note that the processing of FIG. 4 is common processing which is also performed in single "normal" image capturing and, in the case of the consecutive image capturing which is always started with "normal" image capturing, no operation is performed at Step S22 since the light source 3 has already been turned on and the infrared cut filter has already been set at Step S10. Then, as autofocus (AF) processing (normal) for "normal" image capturing, the CPU 17 performs processing in which, in order to determine a focal position for image capturing, the CPU 17 controls the lens driving section 16 so as to search for a focal position while emitting white light from the light source 3 (Step S24). Then, the CPU 17 judges whether or not the search has been successfully completed (Step S26).

When judged that the search has been successfully completed (YES at Step S26), the CPU 17 moves the focus lens to this focal position for normal image capturing (Step S28). When judged that the search has not been successfully completed, (NO at Step S26), the CPU 17 determines a non-focal position for normal image capturing as a focal position, and moves the focus lens to the determined focal position (Step S30). In either case, the CPU 17 records the focal position (or non-focal position) (X) (Step S32). Then, the image sensor 12 captures an image with the focus lens being set at the recorded focal position X, the infrared cut filter of the filter unit 7 being set on the optical axis, and white light being emitted from the light source 3 (Step S34). As a result, a "normal" capturing image is acquired. Next, the CPU 17 turns off the light source 3 which is emitting white light (Step S36).

<"Green" Image Capturing>

Figure 5:
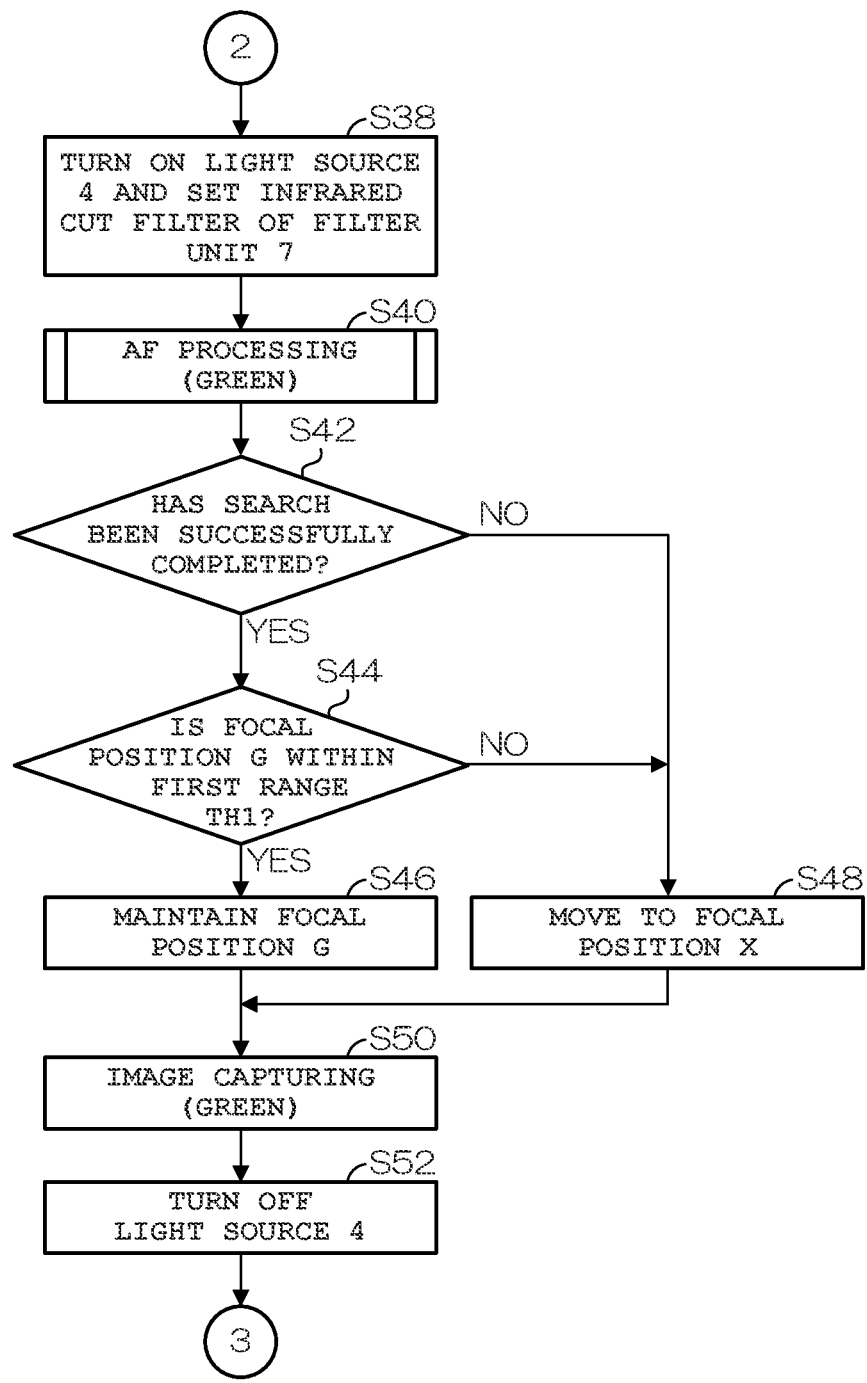
FIG. 5 is still another flowchart for describing the imaging operations (consecutive image capturing) by the imaging apparatus according to the present embodiment.

Following the above-described "normal" image capturing, the CPU 17 turns on the light source 4 that emits green light, and sets the infrared cut filter of the filter unit 7 on the optical axis (Step S38 in FIG. 5). Note that the processing of FIG. 5 is common processing which is also performed in single "green" image capturing and, in the case of the consecutive image capturing, only a power-on operation for the light source 4 is performed at Step S38 since the infrared cut filter of the filter unit 7 has already been set on the optical axis. Next, as autofocus (AF) processing (green) for "green" image capturing, the CPU 17 performs processing in which, in order to determine a focal position for image capturing, the CPU 17 controls the lens driving section 16 so as to search for a focal position while emitting green light to the photographic subject from the light source 4 through the green filter 41 (Step S40). Then, the CPU 17 judges whether or not the search has been successfully completed (Step S42). When judged that the search has been successfully completed (YES at Step S42), the CPU 17 judges, on the basis of the focal position X in the "normal" image capturing and a focal position G acquired by this search, whether or not this focal position G is within a first range TH1 (acceptable range; first acceptable range) (whether or not a first condition has been satisfied) (Step S44). Note that the condition at step S44 in the present embodiment corresponds to a first condition in the claims of the invention.

Here, details of the first range TH1 are described. In the "green" image capturing, this first range TH1 is set on the basis of the focal position X and a value acquired by a depth of field corresponding to the focal position X being multiplied by a first predetermined multiple (such as 1.5). In an example where the focal position X for the "normal" image capturing is represented by the number of pulses that is used when the driving of the pulse motor of the lens driving section 16 is controlled, this focal position X is 2000 [pulses], and the depth of field corresponding to this focal position X (depth at the focal distance) is 8 [pulses]. In this case, the first range TH1 in the "green" image capturing is set within a range of 2000±(8 [pulses]*1.5)/2)=2000±6 [pulses] with reference to the focal position X (on the basis of the depth of field corresponding to the focal position X). That is, in the case where the focal position X is 2000 pulses, a first condition is set which indicates that the focal position G is required to be within a range of 1994 to 2006 pulses which serves as the first range TH1, and a judgment as to whether or not the focal position G satisfies the first condition is made.

Then, when the focal position G is within the first range TH1 set on the basis of the focal position X for the "normal" image capturing and the depth of field corresponding to the focal position X (YES at Step S44), the CPU 17 maintains the focal position G (Step S46). Then, the image sensor 12 captures an image with the focus lens being set at the focal position G, the infrared cut filter of the filter unit 7 being set on the optical axis, and green light being emitted from the light source 4 through the green filter 41 (Step S50). As a result, a "green" capturing image is acquired.

Conversely, when judged that the search has not been successfully completed (NO at Step S42) or that the search has been successfully completed but the focal position G is not within the first range TH1 (NO at Step S44), the CPU 17 judges that there is a high possibility that the focal position G is significantly away from the right focal position and defocusing has occurred, and moves the focus lens to the focal position X (Step S48). Then, the image sensor 12 captures an image with the focus lens being set at the same focal position X as that of the "normal" capturing image, the infrared cut filter of the filter unit 7 being set on the optical axis, and green light being emitted from the light source 4 through the green filter 41 (Step S50). As a result, a "green" capturing image is acquired. In the case of the above-described example using the number of pulses, when the focal position G for the "green" image capturing is within a range of the focal position X±6 [pulses], the focal position G is not corrected. When the focal position G for the "green" image capturing is not within a range of the focal position X±6 [pulses], the focal position G is corrected such that image capturing is performed with the focus lens being set at the focal position X. After the "green" image capturing, the CPU 17 turns off the light source 4 emitting green light (Step S52).

<"Polarization" Image Capturing>

Figure 6:
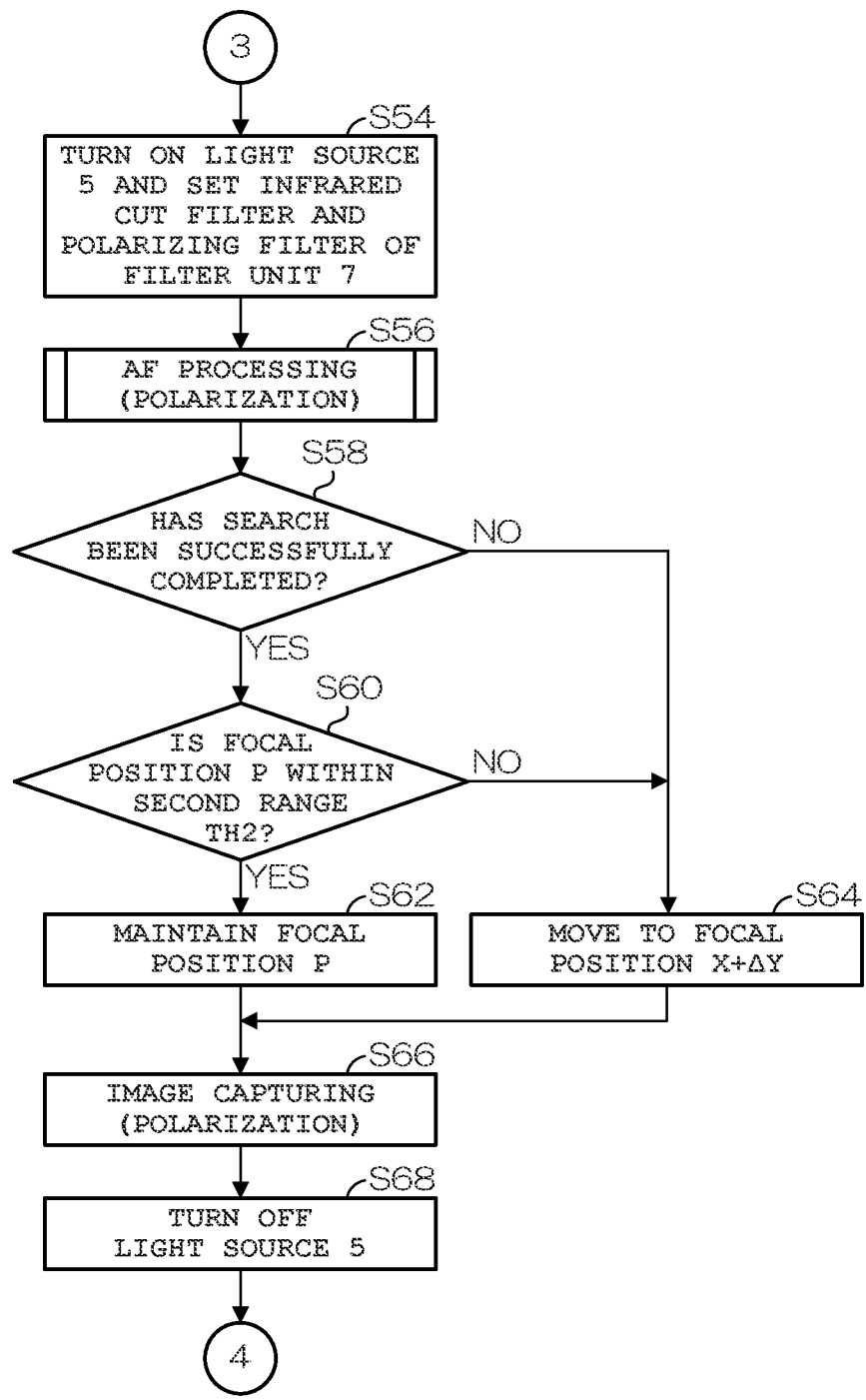
FIG. 6 is yet another flowchart for describing the imaging operations (consecutive image capturing) by the imaging apparatus according to the present embodiment.

Following the above-described "green" image capturing, the CPU 17 turns on the light source 5 that emits polarized light, and sets the infrared cut filter and polarizing filter of the filter unit 7 on the optical axis (Step S54 in FIG. 6). Note that the processing of FIG. 6 is common processing which is also performed in single "polarization" image capturing and, in the case of the consecutive image capturing, only a power-on operation for the light source 5 and a setting operation for the polarizing filter are required to be performed at Step S54 since the infrared cut filter of the filter unit 7 has already been set on the optical axis in the "normal" image capturing and the "green" image capturing. Next, as autofocus (AF) processing (polarization) for "polarization" image capturing, the CPU 17 performs processing in which, in order to determine a focal position for image capturing, the CPU 17 controls the lens driving section 16 so as to search for a focal position while emitting polarized light to the photographic subject from the light source 5 through the polarizing filter 51 (Step S56). Then, the CPU 17 judges whether or not the search has been successfully completed (Step S58). When judged that the search has been successfully completed (YES at Step S58), the CPU 17 judges, on the basis of the focal position X in the "normal" image capturing, the depth of field corresponding to the focal position X, and a unique difference $\Delta y$, whether or not a focal position P acquired by the search is within a second range TH2 (acceptable range; second acceptable range) (whether or not a second condition has been satisfied) (Step S60). Note that the condition at Step S60 in the present embodiment corresponds to a first or second condition in the claims of the invention.

Here, details of the second range TH2 are described. Because of the characteristics of the polarizing filter of the filter unit 7, the focal position P for the "polarization" image capturing has the unique difference $\Delta y$ with respect to the focal position X for the "normal" image capturing. This unique difference $\Delta y$ is a value depending on an object distance and an individual. For example, in the case where the focal position X for the "normal" image capturing is 2000 [pulses], this unique difference $\Delta y$ unique to the polarizing filter is +77 [pulses]. That is, the focal position P for the "polarization" image capturing is 2000+77=2077 [pulses] from a design viewpoint (in theory). Accordingly, in consideration of this unique difference $\Delta y$, the above-described second range TH2 is set on the basis of the focal position X, a value acquired by the depth of field corresponding to the focal position X being multiplied by a second predetermined multiple (such as 2), and the unique difference $\Delta y$. For example, in the case where the focal position x acquired by the autofocusing for the "normal" image capturing is 2000 [pulses] and the depth of field (depth at the focal distance) corresponding to the focal position X is 8 [pulses], the second range TH2 for the "polarization" image capturing" is set to a range of 2000+($\Delta y$±(8 [pulses]*2)/2)=2000+69~2000+85 [pulses] with reference to the focal position x and in consideration of the unique difference $\Delta y$. That is, in the case where the focal position X is 2000 pulses, a second condition is set which indicates that the focal position P is required to be within a range of 2069 to 2085 pulses which serves as the second range TH2, on the basis of the focal position X, the depth of field corresponding thereto, and the unique difference $\Delta y$. Then, a judgment as to whether or not the focal position P satisfies the second condition is made. Note that details of the unique difference $\Delta y$ are described later.

Then, when the focal position P is within the second range TH2 set on the basis of the focal position X for the "normal" image capturing, the depth of field corresponding to the focal position X, and the unique difference $\Delta y$ (YES at Step S60), the CPU 17 maintains the focal position P (Step S62). Then, the image sensor 12 captures an image with the focus lens being set at the focal position P, the infrared cut filter and polarizing filter of the filter unit 7 being set on the optical axis such that the filters overlap with each other, and polarized light being emitted to the photographic subject from the light source 5 through the polarizing filter 51 (Step S66). As a result, a "polarization" capturing image is acquired.

Conversely, when judged that the search has not been successfully completed (NO at Step S58) or that the search has been successfully completed but the focal position P is not within the second range TH2 (NO at Step S60), the CPU 17 judges that there is a high possibility that the focal position P is significantly away from the right focal position and defocusing has occurred, and moves the focus lens to the focal position X+Δy (Step S64). Then, the image sensor 12 captures an image with the focus lens being set at the focal position X+Δy, the infrared cut filter and polarizing filter of the filter unit 7 being set on the optical axis such that the filters overlap with each other, and polarized light being emitted to the photographic subject from the light source 5 through the polarizing filter 51 (Step S66). As a result, a "polarization" capturing image is acquired. In the case of the above-described example using the number of pulses, when the focal position P is within a range of 2069 to 2085 [pulses], the CPU 17 does not correct the focal position P. Conversely, when the focal position P for the "polarization" image capturing is not within a range of 2069 to 2085 [pulses], such as when the focal position P is 2095 [pulses], the CPU 17 corrects the focal position P such that image capturing is performed with the lens being set at the focal position X+Δy (2000+77=2077). After the "polarization" image capturing, the CPU 17 returns to Step S10 and repeats the above-described processing.

Here, the unique difference Δy unique to the polarizing filter of the filter unit 7 and the method for correcting the focal position P for the "polarization" image capturing are described. As described above, in "polarization" image capturing, a unique difference caused by change in an optical path length by a polarizing filter or the like exists in addition to fluctuations in focal positions.

Figure 7:
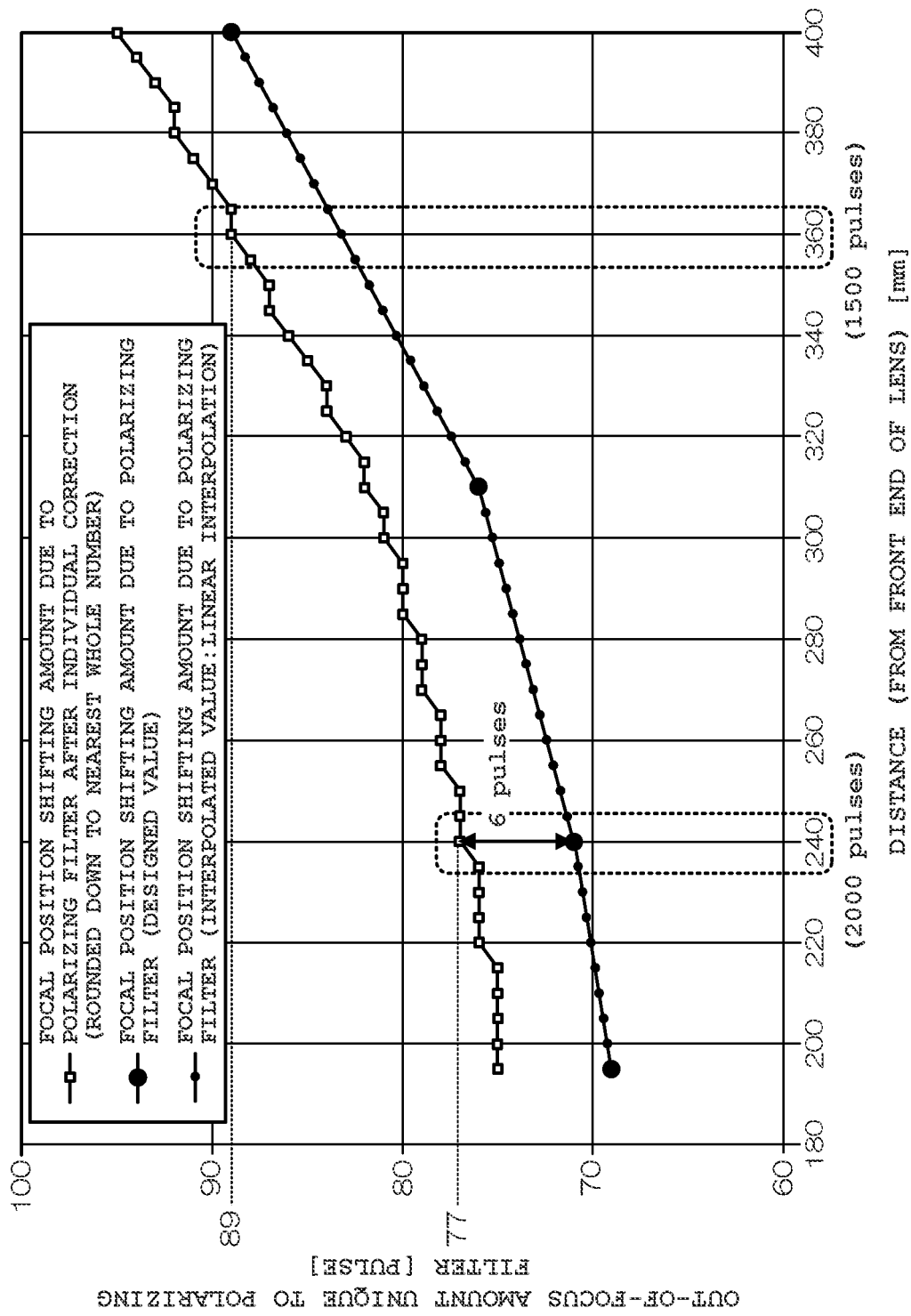
FIG. 7 is a characteristic diagram showing an out-of-focus amount unique to a polarizing filter in the imaging apparatus according to the present embodiment.

FIG. 7 is a characteristic diagram showing an out-of-focus amount unique to the polarizing filter in the imaging apparatus according to the present embodiment. In the drawing, the horizontal axis indicates a distance (from the front end of a lens) to a photographic subject, and the vertical axis indicates an out-of-focus amount (pulse) unique to the polarizing filter with respect to a focal position for "normal" image capturing.

Here, the above-described out-of-focus amount [pulse] is described. In the present embodiment, a focal position shifting amount due to the polarizing filter with respect to a focal position for "normal" image capturing with no polarizing filter (hereinafter referred to as "normal imaging focal position") is represented in a unit (pulse) that is used when the driving of the pulse motor of the lens driving section 16 is controlled. In the autofocus processing, the imaging lens group 2 (focus lens) is moved by the pulse motor from the infinite range side to the close range side in the optical axis direction (or vice versa), and a judgment as to whether or not focusing has been successfully completed is made based on whether or not an image of a photographic subject has been formed (the peak of contrast has been detected) by the image sensor 12. When judged that focusing has been successfully completed, the imaging lens group 2 (focus lens) is stopped at that focal position. Because of this configuration, the position of the imaging lens group 2 (focus lens) at the time of focusing can be uniquely acquired by the number of pulses applied to the pulse motor. That is, each focal position and each focal position shifting amount can be represented by the number of pulses. In the case of the example shown in FIG. 7, a focal position when a distance from the front end of the imaging lens group 2 to a photographic subject is 240 mm corresponds to 2000 [pulses], and a focal position when this distance is 360 mm corresponds to 1500 [pulses].

In the drawing, each large black dot on the solid line on the lower side denotes a focal position shifting amount (designed value) due to the polarizing filter with respect to a normal imaging focal position. In addition, small black dots on the solid line on the lower side denote interpolated values acquired by the above-described designed values being subjected to linear interpolation. Also, each white square on the solid line on the upper side denotes a value acquired by an individual correction value (for example, a value measured at 240 mm is 6 [pulses]) unique to the polarizing filter being added. In the present embodiment, an out-of-focus amount unique to the polarizing filter which corresponds to the solid line connecting the white squares with straight lines is used as a unique difference Δy.

When a focal position X for "normal" image capturing is 2000 [pulses](at 240 mm), and a depth of field corresponding thereto is 8 [pulses], a unique difference Δy unique to the polarizing filter is 77 [pulses] according to FIG. 7. In addition, in consideration of the above-described second range TH2 being twice the depth of field in "polarization" image capturing, this second range TH2 is 2000+(Δy±(8 [pulses]*2)/2)=2069 to 2085 [pulses] with reference to the focal position X and in consideration of the unique difference Δy, that is, on the basis of the depth of field corresponding to the focal position X and the unique difference Δy. Thus, when the focal position X is 2000 pulses, the range to be compared to a focal position P is from 2069 to 2085 [pulses] based on the focal position X, the depth of field corresponding thereto, and the unique difference Δy. Accordingly, for example, when the focal position X for "normal" image capturing is 2000 [pulses] and the focal position P for "polarization" image capturing is 2100 [pulses], the focal position P is not within this range of 2069 to 2085 [pulses] which are the second range TH2. Therefore, correction with reference to the focal position X (reliable focal position) for "normal" image capturing is performed. The imaging focal position for "polarization" image capturing after this correction is 2000+Δy (77)=2077 [pulses].

Also, when a focal position X for "normal" image capturing is 1500 [pulses](at 360 mm), and a depth of field corresponding thereto is 10 [pulses], a unique difference Δy unique to the polarizing filter is 89 [pulses] according to FIG. 7. In addition, in consideration of the above-described second range TH2 being twice the depth of field in "polarization" image capturing, this second range TH2 is 1500+(Δy±(10 [pulses]*2)/2)=1579 to 1599 [pulses] with reference to the focal position X and in consideration of the unique difference Δy, that is, on the basis of the focal position X, the depth of field corresponding to the focal position X, and the unique difference Δy. Thus, when the focal position X is 1500 pulses, the range to be compared to a focal position P is from 1579 to 1599 [pulses] based on the focal position X, the depth of field corresponding thereto, and the unique difference Δy. Accordingly, for example, when the focal position X for "normal" image capturing is 1500 [pulses] and the focal position P for "polarization" image capturing is 1600 [pulses], the focal position P is not within this range of 1579 to 1599 [pulses] which are the second range TH2. Therefore, correction with reference to the focal position X (reliable focal position) for "normal" image capturing is performed. The imaging focal position for "polarization" image capturing after this correction is 1500+Δy (89)=1589 [pulses].

According to the above-described embodiment, in "normal" image capturing, a focal position X of the imaging lens group 2 with respect to a photographic subject which is being irradiated with white light is specified as an imaging focal position for "normal" image capturing (Step S24 to Step S32 in FIG. 4). Subsequently, in "green" image capturing, a focal position G of the imaging lens group 2 with respect to the photographic subject which is being irradiated with green light is searched (Step S40 in FIG. 5), and a judgment as to whether or not the focal position G is within a first range TH1 is made (Step S44). When the focal position G is within the first range TH1, this focal position G is specified as an imaging focal position for "green" image capturing (Step S46). Conversely, when the focal position G is not within the first range TH1, an imaging focal position for "green" image capturing is specified on the basis of the focal position X for the "normal" image capturing (Step S48), and a "green" capturing image of the photographic subject irradiated with green light is acquired, which has been captured by the image sensor 12 with the focus lens being set at the imaging focal position for "green" image capturing (Step S50). As a result of this configuration, fluctuations in focal positions by autofocusing in "green" image capturing can be suppressed, and the frequency of image capturing at an out-of-focus focal position can be reduced.

Also, according to the above-described embodiment, in "normal" image capturing, a focal position X of the imaging lens group 2 with respect to a photographic subject which is being irradiated with white light is specified as an imaging focal position for "normal" image capturing. Subsequently, in "polarization" image capturing, a focal position P of the imaging lens group 2 with respect to the photographic subject which is being irradiated with polarized light is searched (Step S56 in FIG. 6), and a judgment as to whether or not the focal position P for "polarization" image capturing is within a second range TH2 is made (Step S60). When the focal position P for "polarization" image capturing is within the second range TH2, this focal position P is specified as an imaging focal position for "polarization" image capturing (Step S62). Conversely, when the focal position P for "polarization" image capturing is not within the second range TH2, an imaging focal position for "polarization" image capturing is specified on the basis of the focal position X for the "normal" image capturing (Step S64). Then, a "polarization" capturing image of the photographic subject irradiated with polarized light is acquired, which has been captured by the image sensor 12 with the focus lens being set at the imaging focal position for "polarization" image capturing (Step S66). As a result of this configuration, fluctuations in focal positions by autofocusing in "polarization" image capturing can be suppressed, and the frequency of image capturing at an out-of-focus focal position can be reduced.

In addition, according to the above-described embodiment, in the "polarization" image capturing, when the focal position P for the "polarization" image capturing is not within the second range TH2, this focal position P is corrected to be $X+\Delta y$ on the basis of a unique difference $\Delta y$ unique to the polarizing filter and the focal position X for the "normal" image capturing (Step S64), whereby an imaging focal position for the "polarization" image capturing is specified. As a result of this configuration, fluctuations in focal positions in "polarization" image capturing can be more effectively suppressed, and image defocusing can be reduced.

C. Modification Example

In the above-described embodiment, in "green" image capturing and "polarization" image capturing, when a focal position search is not successfully completed, focal position correction is performed without judging whether or not a focal position G or P is within a first range TH1 or a second range TH2. In contrast, in a modification example, when a focal position search is not successfully completed in "green" image capturing or "polarization" image capturing, a non-focal position is set as a focal position G or P, and a difference between the focal position G or P and a focal position X for "normal" image capturing is judged.

Figure 8:
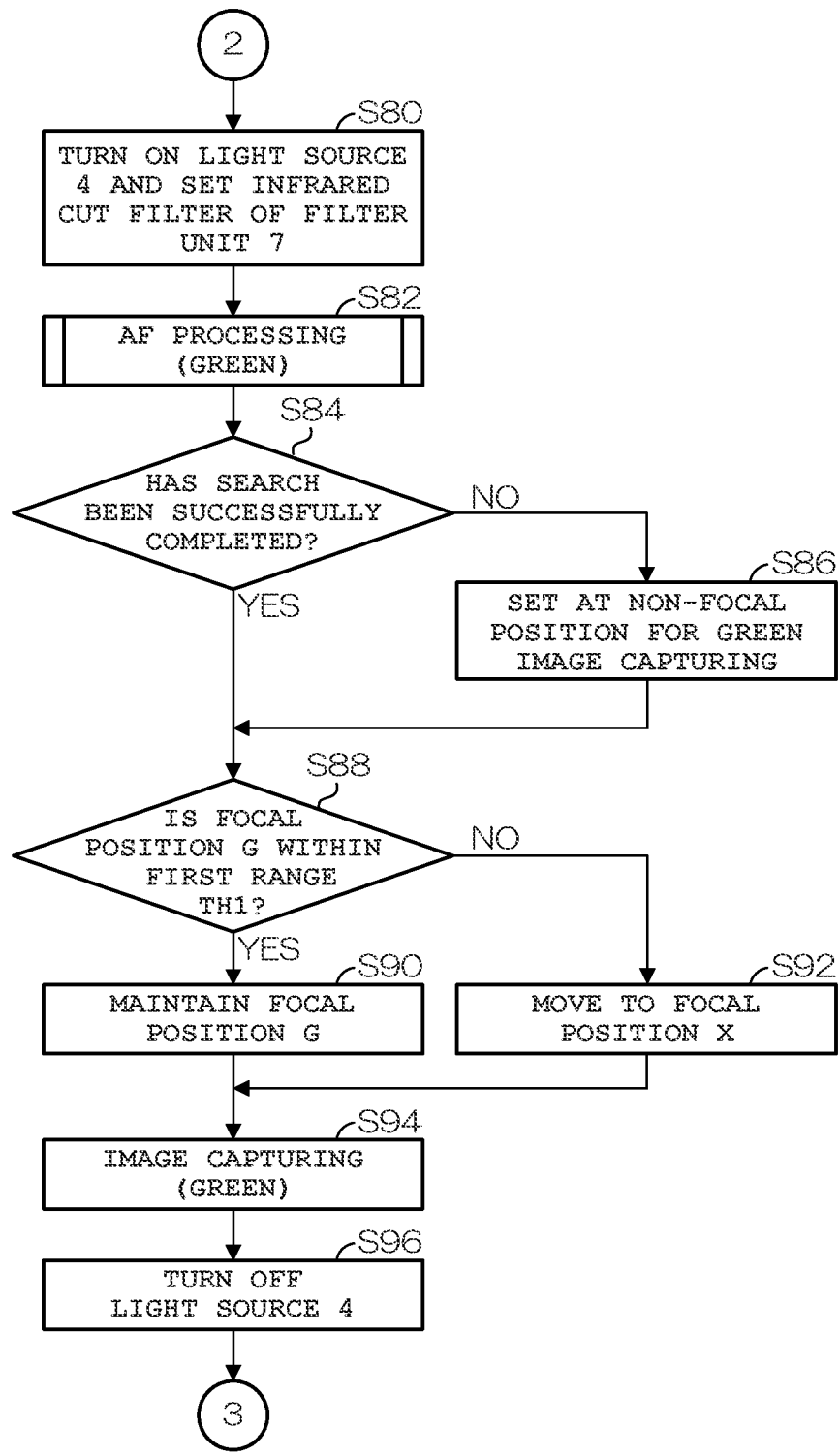
FIG. 8 is a flowchart for describing imaging operations (consecutive image capturing) by a modification example of the present embodiment.
Figure 9:
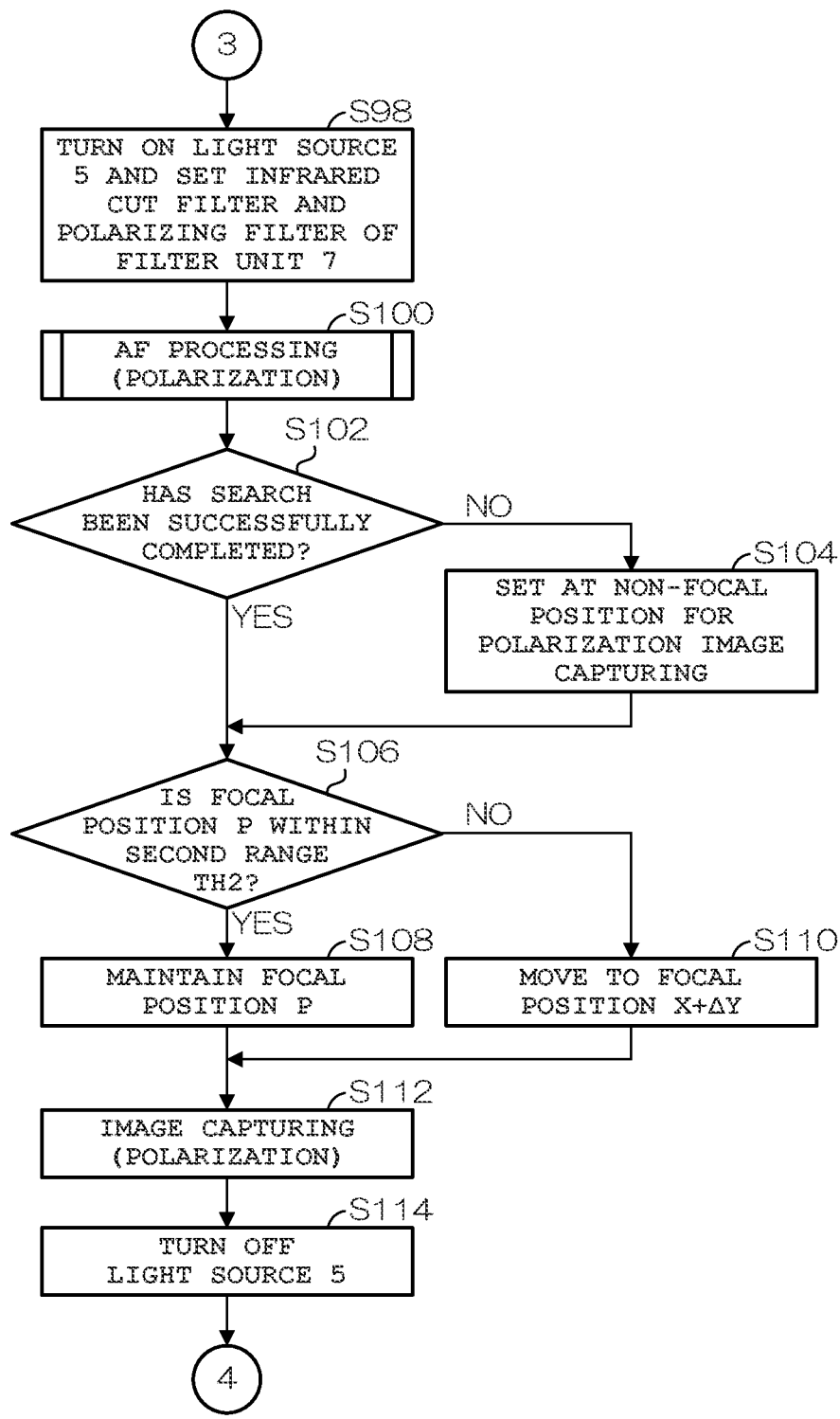
FIG. 9 is another flowchart for describing the imaging operations (consecutive image capturing) by the modification example of the present embodiment.

FIG. 8 and FIG. 9 are flowcharts for describing imaging operations (consecutive image capturing) by this modification example of the present embodiment. Note that Step S10 to Step S18 from power-on to a full-depression operation on the shutter release button 6 and Step S20 to Step S36 regarding "normal" image capturing are the same as those of the above-described embodiment and therefore descriptions thereof are omitted.

<"Green" Image Capturing>

Following "normal" image capturing, the CPU 17 turns on the light source 4 that emits green light, and sets the infrared cut filter of the filter unit 7 on the optical axis (Step S80). Note that the processing of FIG. 8 is common processing which is also performed in single "green" image capturing and, in the case of the consecutive image capturing, only a power-on operation for the light source 4 is performed at Step S80 since the infrared cut filter of the filter unit 7 has already been set on the optical axis. Next, as autofocus (AF) processing (green) for "green" image capturing, the CPU 17 performs processing in which, in order to determine a focal position for image capturing, the CPU 17 controls the lens driving section 16 so as to search for a focal position while emitting green light to a photographic subject from the light source 4 through the green filter 41 (Step S82). Then, the CPU 17 judges whether or not the search has been successfully completed (Step S84). When judged that the search has not been successfully completed (NO at Step S84), the CPU 17 sets the focus lens at this non-focal position for "green" image capturing. That is, the CPU 17 sets this non-focal position as a focal position G (Step S86).

After setting the non-focal position as the focal position G, or when judged that the search has been successfully completed (YES at Step S84), the CPU 17 judges whether or not this focal position G is within a first range TH1 set on the basis of a focal position X for the "normal" image capturing and a depth of field corresponding to the focal position X (Step S88). Note that the condition at Step S88 in this modification example corresponds to the first condition in the claims of the invention.

Then, when the focal position G is within the first range TH1 (YES at Step S88), the CPU 17 maintains the focal position G (Step S90). Then, the image sensor 12 captures an image with the infrared cut filter of the filter unit 7 being set on the optical axis, and green light being emitted to the photographic subject from the light source 4 through the green filter 41 (Step S50). As a result, a "green" capturing image is acquired.

Conversely, when the focal position G is not within the first range TH1 (NO at Step S88), the CPU 17 judges that there is a high possibility that the focal position G is significantly away from the right focal position and defocusing has occurred, and moves the focus lens to the focal position X (Step S92). Then, the image sensor 12 performs image capturing with the focus lens being set at the same focal position X as that of the "normal" capturing image, the infrared cut filter of the filter unit 7 being set on the optical axis, and green light being emitted to the photographic subject from the light source 4 through the green filter 41, and thereby acquires a "green" capturing image (Step S94). Then, after the "green" image capturing, the CPU 17 turns off the light source 4 emitting green light (Step S96).

<"Polarization" Image Capturing>

Following the above-described "green" image capturing, the CPU 17 turns on the light source 5 that emits polarized light, and sets the infrared cut filter and polarizing filter of the filter unit 7 on the optical axis (Step S98 in FIG. 9). Note that the processing of FIG. 9 is common processing which is also performed in single "polarization" image capturing and, in the case of the consecutive image capturing, only a power-on operation for the light source 5 and a setting operation for the polarizing filter are required to be performed at Step S98 since the infrared cut filter of the filter unit 7 has already been set on the optical axis in the "normal" image capturing and the "green" image capturing. Next, as autofocus (AF) processing (polarization) for "polarization" image capturing, the CPU 17 performs processing in which, in order to determine a focal position for image capturing, the CPU 17 controls the lens driving section 16 so as to search for a focal position while emitting polarized light to the photographic subject from the light source 5 through the polarizing filter 51 (Step S100). Then, the CPU 17 judges whether or not the search has been successfully completed (Step S102). When judged that the search has not been successfully completed (NO at Step S102), the CPU 17 sets the focus lens at this non-focal position for "polarization" image capturing. That is, the CPU 17 sets this non-focal position as a focal position P (Step S86).

After setting the non-focal position as the focal position P, or when judged that the search has been successfully completed (YES at Step S102), the CPU 17 judges whether or not this focal position P is within a second range TH2 set on the basis of the focal position X for the "normal" image capturing, the depth of field corresponding to the focal position X, and a unique difference Δy (Step S106). Note that the condition at Step S106 in this modification example corresponds to the first condition or the second condition in the claims of the invention.

Then, when the focal position P is within the second range TH2 (YES at Step S106), the CPU 17 maintains the focal position P (Step S108). Then, the image sensor 12 captures an image with the infrared cut filter and polarizing filter of the filter unit 7 being set on the optical axis such that the filters overlap with each other, and polarized light being emitted to the photographic subject from the light source 5 through the polarizing filter 51 (Step S112). As a result, a "polarization" capturing image is acquired.

Conversely, when the focal position P is not within the second range TH2 (NO at Step S106), the CPU 17 judges that there is a high possibility that the focal position P is significantly away from the right focal position and defocusing has occurred, and moves the focus lens to the focal position X+Δy (Step S110). Then, the image sensor 12 captures an image with the infrared cut filter and polarizing filter of the filter unit 7 being set on the optical axis such that the filters overlap with each other, and polarized light being emitted to the photographic subject from the light source 5 through the polarizing filter 51 (Step S112). As a result, a "polarization" capturing image is acquired. After this "polarization" image capturing, the CPU 17 turns off the light source 5 (Step S114). Thereafter, the CPU 17 returns to Step S10 and repeats the above-described processing.

D. Effect of Focal Position Correction

Figure 10:
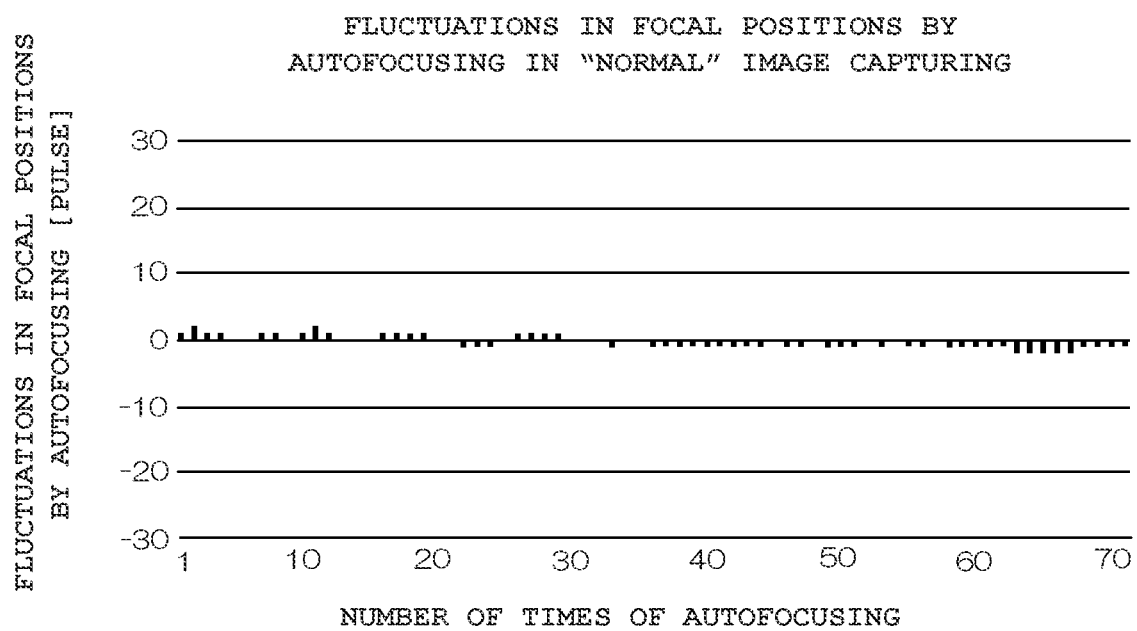
FIG. 10 is a conceptual diagram for describing each focal position in "normal" image capturing according to the present embodiment.

FIG. 10 is a conceptual diagram for describing each focal position in "normal" image capturing according to the present embodiment. In FIG. 10, fluctuations in focal positions by autofocusing in "normal" image capturing are shown. The vertical axis in the drawing denotes fluctuations when autofocus processing is sequentially performed seventy-one times with the imaging apparatus 1 being fixed and without its imaging environment (ambient light) being changed as much as possible, and the average value of focal positions is "0". As shown in the drawing, fluctuations in focal positions X by autofocusing in "normal" image capturing are very small, and focusing accuracy therein is actually high, so that image defocusing rarely occurs in "normal" image capturing.

Figure 11A:
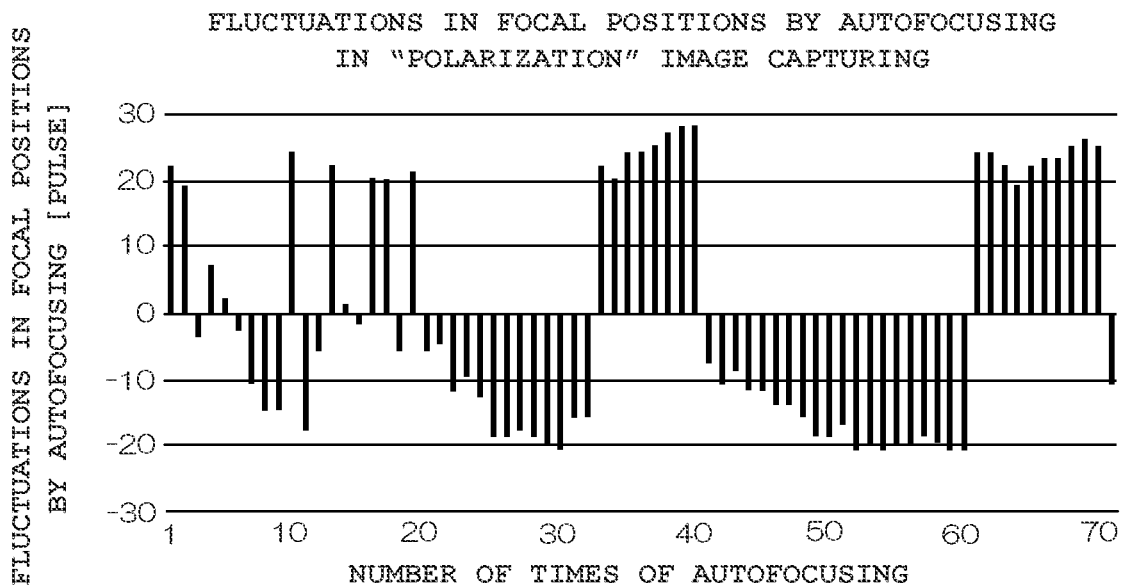
FIG. 11A is a conceptual diagram for describing each focal position in "polarization" image capturing according to the present embodiment.
Figure 11B:
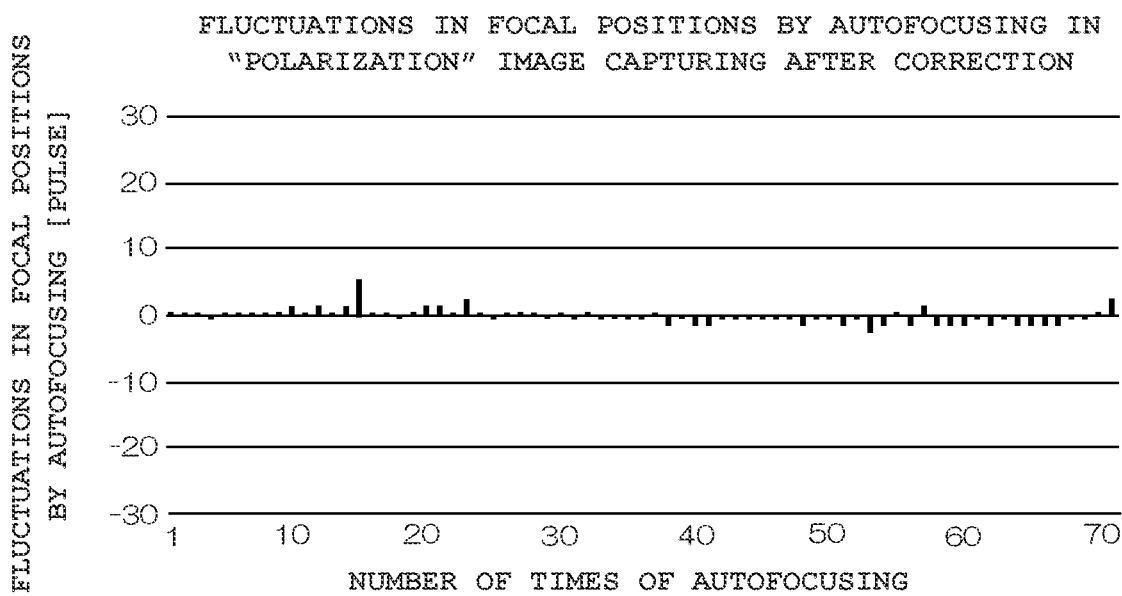
FIG. 11B is a conceptual diagram for describing the effect of the correction of each focal position in "polarization" image capturing according to the present embodiment.

FIG. 11A and FIG. 11B are conceptual diagrams for describing the effect of the correction of each focal position in "polarization" image capturing according to the present embodiment, of which FIG. 11A shows fluctuations in focal positions by autofocusing in "polarization" image capturing, and FIG. 11B shows fluctuations in focal positions after correction. As in the case of the "normal" image capturing, the vertical axis denotes fluctuations when autofocus processing is sequentially performed seventy-one times with the imaging apparatus 1 being fixed and without its imaging environment (ambient light) being changed as much as possible, and the average value of focal positions is "0". As shown in FIG. 11A, fluctuations in focal positions P by autofocusing are very large in "polarization" image capturing and, in actuality, images captured in "polarization" image capturing are more likely to be defocused images. However, with the present embodiment and the modification example, fluctuations in focal positions P by autofocusing can be made significantly smaller by the focal positions P being corrected, as shown in FIG. 11B. As a result, defocused images in "polarization" image capturing can be reduced. Note that, in "green" image capturing as well, fluctuations in focal positions can be made smaller and defocused images can be reduced as in the case of the "polarization" image capturing although not shown in the drawing.

According to the above-described embodiment, a first condition based on a focal position X for "normal" image capturing and a focal position G for "green" image capturing (or a focal position P for "polarization" image capturing) serves as a condition that is satisfied when the focal position G (or P) is within a first range TH1 (or second range TH2) based on the focal position X. When the focal position G (or P) is within the first range TH1 (or second range TH2), the focal position G (or the focal position P) is specified as an imaging focal position for "green" image capturing (or "polarization" image capturing). Conversely, when the focal position G (or P) is not within the first range TH1 (or second range TH2), an imaging focal position for "green" image capturing (or "polarization" image capturing) is specified on the basis of the focal position X, and a "green" capturing image (or a "polarization" capturing image) is acquired by the image sensor 12 with the focus lens being set at the specified imaging focal position. As a result of this configuration, fluctuations in focal positions by autofocusing in each image capturing can be suppressed, and image defocusing can be reduced.

Also, according to the above-described embodiment, a "normal" capturing image captured by the image sensor 12 with the focus lens being set at a focal position X specified in "normal" image capturing is acquired. As a result of this configuration, fluctuations in focal positions by autofocusing in each image capturing can be suppressed, and image defocusing can be reduced.

Moreover, according to the above-described embodiment, a first range (second range) is set on the basis of a focal position X and a depth of field corresponding to the focal position X. As a result of this configuration, a suitable range can be set according to a depth of field, fluctuations in focal positions by autofocusing in each image capturing can be suppressed, and image defocusing can be reduced.

Furthermore, according to the above-described embodiment, an allowable range is set on the basis of a focal position X and a value acquired by a depth of field corresponding to the focal position X being multiplied by a predetermined multiple. As a result of this configuration, a suitable range can be set according to a depth of field, fluctuations in focal positions by autofocusing in each image capturing can be suppressed, and image defocusing can be reduced.

Still further, according to the above-described embodiment, when a first condition based on a focal position X for "normal" image capturing and a focal position P for "polarization" image capturing is not satisfied and the focal position P is not within a second range TH2 based on the focal position X, the focal position P is corrected on the basis of a unique difference Δy unique to the polarizing filter and the focal position X so as to specify an imaging focal position X+Δy. That is, a new focal position P is set on the basis of the unique difference Δy and the focal position X so as to specify an imaging focal position. As a result of this configuration, fluctuations in focal positions by autofocusing in "polarization" image capturing can be suppressed, and image defocusing can be reduced.

Yet still further, according to the above-described embodiment, only by one operation being performed by the user on the shutter release button 6 serving as an operation section, the types of image capturing can be switched to "green" image capturing and then "polarization" image capturing after the acquisition of a captured image by "normal" image capturing. As a result of this configuration, consecutive image capturing with different types of irradiation light emitted from different light sources can be performed by only one operation, whereby fluctuations in focal positions by autofocusing in each image capturing can be suppressed, and image defocusing can be reduced.

Yet still further, according to the above-described embodiment, a first condition based on a focal position X for "normal" image capturing and a focal position G for "green" image capturing serves as a condition that is satisfied when the focal position G is within a first range TH1 based on the focal position X. When the focal position G is within the first range TH1, this focal position G is specified as an imaging focal position for "green" image capturing. Conversely, when the focal position G is not within the first range TH1, an imaging focal position for "green" image capturing is specified on the basis of the focal position X, and a "green" capturing image captured by the image sensor 12 with the focus lens being set at the specified imaging focal position for "green" image capturing is acquired. In addition, a second condition based on the focal position X for "normal" image capturing and a focal position P for "polarization" image capturing serves as a condition that is satisfied when the focal position P is within a second range TH2 based on the focal position X. When the focal position P is within the second range TH2, this focal position P is specified as an imaging focal position for "polarization" image capturing. Conversely, when the focal position P is not within the second range TH2, an imaging focal position for "polarization" image capturing is specified on the basis of the focal position X for "normal" image capturing, and a "polarization" capturing image captured by the image sensor 12 with the focus lens being set at the specified imaging focal position for "polarization" image capturing is acquired. As a result of this configuration, fluctuations in focal positions by autofocusing in each image capturing can be suppressed, and image defocusing can be reduced.

Yet still further, according to the above-described embodiment, a "normal" capturing image captured by the image sensor 12 with the focus lens being set at a specified focal position X is acquired in "normal" image capturing. As a result of this configuration, fluctuations in focal positions by autofocusing in each image capturing can be suppressed, and image defocusing can be reduced.

Yet still further, according to the above-described embodiment, a first range TH1 and a second range TH2 are set to be ranges each of which is based on a depth of field corresponding to a focal position X. As a result of this configuration, a suitable range can be set in accordance with a depth of field, fluctuations in focal positions by autofocusing in each image capturing can be suppressed, and image defocusing can be reduced.

Yet still further, according to the above-described embodiment, a first range TH1 is set to be a range that is acquired by a depth of field corresponding to a focal position X being multiplied by a first predetermined multiple, and a second range TH2 is set to be a range that is acquired by the depth of field corresponding to the focal position X being multiplied by a second predetermined multiple. As a result of this configuration, a suitable range can be set in accordance with a depth of field, fluctuations in focal positions by autofocusing in each image capturing can be suppressed, and image defocusing can be reduced.

Yet still further, according to the above-described embodiment, when a focal position P for "polarization" image capturing is not within a second range TH2, this focal position P is corrected on the basis of a unique difference Δy unique to the polarizing filter and a focal position X so as to specify an imaging focal position. That is, a new focal position P is set on the basis of the unique difference Δy and the focal position X so as to specify an imaging focal position. As a result of this configuration, fluctuations in focal positions by autofocusing in "polarization" image capturing can be suppressed, and image defocusing can be reduced.

Yet still further, according to the above-described embodiment, only by one operation being performed by the user on the shutter release button 6 serving as an operation section, an image captured by "normal" image capturing is acquired, an image captured by "green" image capturing after irradiation light is switched to the green light of the light source 4 is acquired, and an image captured by "polarization" image capturing after irradiation light is switched to the polarized light of the light source 5 is acquired. As a result of this configuration, consecutive image capturing with different types of irradiation light emitted from the different light sources can be performed by only one operation, whereby fluctuations in focal positions by autofocusing in each image capturing can be suppressed, and image defocusing can be reduced.

In the above-described embodiment and the modification example, "green" image capturing and "polarization" image capturing have been described as examples of image capturing other than "normal" image capturing. However, the present invention is not limited thereto, and a configuration may be adopted in which the same correction as those of the above-described embodiment and the modification example is performed for image capturing using another optical filter.

Also, in the above-described embodiment and the modification example, "normal" image capturing, "green" image capturing, and "polarization" image capturing are sequentially performed (continuous shooting is performed) by one operation being performed on the shutter release button 6. However, the present invention is not limited thereto, and a configuration may be adopted in which captured images are acquired by the shutter release button 6 being operated for each of "normal" image capturing, "green" image capturing, and the "polarization" image capturing. In this configuration, a focal position X for "normal" image capturing is stored in a storage medium.

Moreover, in the above-described embodiment and the modification example where "normal" image capturing, "green" image capturing, and "polarization" image capturing are sequentially performed (continuous shooting is performed), focal positions G and P for "green" image capturing and "polarization" image capturing are corrected on the basis of a focal position X. However, the present invention is not limited thereto, and a configuration may be adopted in which whether or not to perform this correction can be set by a user operation.

Furthermore, the processing section which performs the above-described imaging control method for the imaging apparatus 1 in the above-described embodiment and the modification example may include a plurality of processors (such as a plurality of CPUs), and the plurality of processing operations performed by the CPU 11 in the embodiment may be performed by these plural processors. That is, in this configuration, these plural processors correspond to the above-described "processing section". Also, these plural processors may be jointly involved in common processing, or may independently perform different processing in parallel.

Still further, in the above-described embodiment and the modification example, in "green" image capturing, a first range TH1 is set on the basis of a focal position X and a depth of field corresponding to the focal position X, and a judgment as to whether or not a focal position G is within the first range TH1 is made. However, the present invention is not limited thereto. For example, a configuration may be adopted in which a judgment is made as to whether or not the difference between a focal position G and a focal position X is within a range based on a depth of field corresponding to the focal position X (or more specifically, a range of ±(8 [pulses]*1.5)/2 described above, which is hereinafter referred as "green image capturing difference range"). Alternatively, a configuration may be adopted in which a judgment is made as to whether or not the ratio (G/X) between a focal position G and a focal position X is within a range based on a depth of field corresponding to the focal position X. In this case where the range to be compared with the ratio (G/X) is required, a coefficient acquired by the ratio (G/X) being divided by the difference (G−X) is multiplied by the above-described green image capturing difference range so as to determine this range. In the above-described cases, a configuration may be adopted in which a first condition is set which is satisfied when a result of comparison between a focal position G and a focal position X is within a range based on a depth of field corresponding to the focal position X as described above, and a judgment is made as to whether or not this first condition is satisfied.

Similarly, in the above-described embodiment and the modification example, in "polarization" image capturing, a second range TH2 is set on the basis of a focal position X, a depth of field corresponding to the focal position X, and a unique difference Δy, and a judgment as to whether or not a focal position P is within the second range TH2 is made. However, the present invention is not limited thereto. For example, a configuration may be adopted in which a judgment is made as to whether or not the difference between a focal position P and a focal position X is within a range based on a depth of field corresponding to the focal position X and a unique difference Δy (or more specifically, a range of (Δy±(8 [pulses]*2)/2)) described above, which is hereinafter referred as "polarization image capturing difference range"). Alternatively, a configuration may be adopted in which a judgment is made as to whether or not the ratio (P/X) between a focal position P and a focal position X is within a range based on a depth of field corresponding to the focal position X and a unique difference Δy. In this case where the range to be compared with the ratio (P/X) is required, a coefficient acquired by the ratio (P/X) being divided by the difference (P−X) is multiplied by the above-described polarization image capturing difference range so as to determine this range. In the above-described cases, a configuration may be adopted in which a first condition or a second condition is set which is satisfied when a result of comparison between a focal position P and a focal position X is within a range based on a depth of field corresponding to the focal position X and a unique difference Δy as described above, and a judgment is made as to whether or not this first or second condition is satisfied.

Yet still further, in the above-described embodiment and the modification example, in "green" image capturing, a first range TH1 is set on the basis of a focal position X and a depth of field corresponding to the focal position X, and a judgment as to whether or not a focal position G is within the first range TH1 is made. However, the present invention is not limited thereto. For example, a configuration may be adopted in which a judgment is made as to whether or not a focal position G+ a value (8 pulses described above) based on a depth of field is larger than a focal position X, and the focal position G− the value based on the depth of field is smaller than the focal position X. Similarly, in the above-described embodiment and the modification example, in "polarization" image capturing, a second range TH2 is set on the basis of a focal position X, a depth of field corresponding to the focal position X, and a unique difference Δy, and a judgment as to whether or not a focal position P is within the second range TH2 is made. However, the present invention is not limited thereto. For example, a configuration may be adopted in which a judgment is made as to whether or not:

(1) a focal position P− a focal position X− a unique difference Δy is larger than a minus value based on a depth of field, and the focal position P− the focal position X− the unique difference Δy is smaller than a plus value based on the depth of field, (2) a focal position P− a unique difference Δy is larger than a focal position X− a value based on a depth of field, and the focal position P− the unique difference Δy is smaller than the focal position X+ the value based on the depth of field, or (3) a focal position P− a unique difference Δy+ a value based on a depth of field is larger than a focal position X, and the focal position P− the unique difference Δy− the value based on the depth of field is smaller than the focal position X.

In the above-described cases, a configuration may be adopted in which a first condition or a second condition is set which is satisfied when a comparison parameter based on one of those focal positions X and G (P) is within an acceptable range based on the other one of those focal positions X and G (P), and a judgment is made as to whether or not this first or second condition is satisfied.

Yet still further, in the above-described embodiment and the modification example, a depth of field is multiplied by a first predetermined multiple (second predetermined multiple) so as to set a first range TH1 (second range TH2). However, a configuration may be adopted in which a depth of field is used as it is without being multiplied by a first predetermined multiple (second predetermined multiple).

While the present invention has been described with reference to the preferred embodiments, it is intended that the invention be not limited by any of the details of the description therein but includes all the embodiments which fall within the scope of the appended claims.

What is claimed is:

1. An imaging control method performed by at least one processor of an imaging control apparatus, the imaging control method comprising:
   specifying a first focal position of an optical system with respect to a photographic subject which is irradiated with first irradiation light;
   acquiring a first captured image of the photographic subject irradiated with the first irradiation light, which is captured by an image sensor with optical system set at the specified first focal position;
   specifying a second focal position of the optical system with respect to the photographic subject which is irradiated with second irradiation light having characteristics different from characteristics of the first irradiation light;
   judging whether or not a first condition based on the first focal position and the second focal position is satisfied;
   setting an imaging focal position based on the second focal position in a case in which the first condition is satisfied, and sets an imaging focal position based on the first focal position in a case in which the first condition is not satisfied; and
   acquiring an image of the photographic subject irradiated with the second irradiation light, which is captured by an image sensor with the optical system set at the imaging focal position.

2. The imaging control method according to claim 1, wherein the first condition is a condition that is satisfied in a case in which the second focal position is within an acceptable range based on the first focal position.

3. The imaging control method according to claim 2, wherein the acceptable range is set based on the first focal position and a depth of field corresponding to the first focal position.

4. The imaging control method according to claim 3, wherein the acceptable range is set based on the first focal position and a value acquired by the depth of field corresponding to the first focal position being multiplied by a predetermined multiple.

5. The imaging control method according to claim 2, comprising:
   in a case in which the second focal position is not within the acceptable range, setting the imaging focal position by correcting the second focal position based on a unique difference existing in image capturing of the photographic subject which is irradiated with the second irradiation light and the first focal position.

6. The imaging control method according to claim 1, wherein the first captured image is captured by the image sensor and acquired by the at least one processor in response to one operation on an operation section by a user, and
   wherein the imaging control method further comprises switching irradiation light which is emitted to the photographic subject from the first irradiation light to the second irradiation light after the first captured image is acquired.

7. An imaging apparatus comprising:
   the at least one processor configured to perform the imaging control method according to claim 1;
   a first light source configured to emit the first irradiation light;
   a second light source configured to emit the second irradiation light;
   the optical system; and
   the image sensor.

8. The imaging apparatus according to claim 7, wherein the first light source is configured to emit white light as the first irradiation light, and
   wherein the second light source is configured to emit visible light of a specific wavelength band as the second irradiation light.

9. An imaging apparatus comprising:
   the at least one processor configured to perform the imaging control method according to claim 1;
   a first light source configured to emit white light as the first irradiation light;
   a second light source configured to emit polarized light as the second irradiation light;
   the optical system; and
   the image sensor.

10. An imaging control method performed by at least one processor of an imaging control apparatus, the imaging control method comprising:
    specifying a first focal position of an optical system with respect to a photographic subject which is irradiated with first irradiation light;
    specifying a second focal position of the optical system with respect to the photographic subject which is irradiated with second irradiation light having characteristics different from characteristics of the first irradiation light;
    judging whether or not a first condition based on the first focal position and the second focal position is satisfied;
    setting a first imaging focal position based on the second focal position in a case in which the first condition is satisfied, and setting a first imaging focal position based on the first focal position in a case in which the first condition is not satisfied;
    acquiring a second captured image of the photographic subject irradiated with the second irradiation light, which is captured by an image sensor with the optical system set at the first imaging focal position;
    specifying a third focal position of the optical system with respect to the photographic subject which is irradiated with third irradiation light having characteristics different from characteristics of the first irradiation light and the second irradiation light;
    judging whether or not a second condition based on the first focal position and the third focal position is satisfied;

setting a second imaging focal position based on the third focal position in a case in which the second condition is satisfied, and setting an imaging focal position based on the first focal position in a case in which the second condition is not satisfied; and acquiring a third captured image of the photographic subject irradiated with the third irradiation light, which is captured by the image sensor with the optical system set at the second imaging focal position.

11. The imaging control method according to claim 10, comprising: acquiring a first captured image of the photographic subject irradiated with the first irradiation light, which is captured by the image sensor with the optical system set at the specified first focal position.

12. The imaging control method according to claim 10, wherein the first condition is a condition that is satisfied when the second focal position is within a first acceptable range based on the first focal position, and
wherein the second condition is a condition that is satisfied when the third focal position is within a second acceptable range based on the first focal position.

13. The imaging control method according to claim 12, wherein the first acceptable range and the second acceptable range are set based on the first focal position and a depth of field corresponding to the first focal position.

14. The imaging control method according to claim 13, wherein the first acceptable range is set based on the first focal position and a value acquired by the depth of field corresponding to the first focal position being multiplied by a first predetermined multiple, and
wherein the second acceptable range is set based on the first focal position and a value acquired by the depth of field corresponding to the first focal position being multiplied by a second predetermined multiple.

15. The imaging control method according to claim 12, comprising:
in a case in which the third focal position is not within the second acceptable range, setting the imaging focal position by correcting the third focal position based on a unique difference existing in image capturing of the photographic subject which is irradiated with the third irradiation light and the first focal position.

16. The imaging control method according to claim 11 wherein the first captured image is captured by the image sensor and acquired by the at least one processor in response to one operation on an operation section by a user, and
wherein the imaging control method further comprises:
switching irradiation light which is emitted to the photographic subject from the first irradiation light to the second irradiation light after the first captured image is acquired; and
switching irradiation light which is emitted to the photographic subject from the second irradiation light to the third irradiation light after the second captured image is acquired.

17. An imaging apparatus comprising:
the at least one processor configured to perform the imaging control method according to claim 10;
a first light source configured to emit the first irradiation light;
a second light source configured to emit the second irradiation light;
a third light source configured to emit the third irradiation light;
the optical system; and
the image sensor.

18. The imaging apparatus according to claim 17,
wherein the first light source is configured to emit white light as the first irradiation light, the second light source is configured to emit visible light of a specific wavelength band as the second irradiation light, and the third light source is configured to emit polarized light as the third irradiation light.

19. An imaging control method performed by at least one processor of an imaging control apparatus, the imaging control method comprising:
specifying a first focal position of an optical system with respect to a photographic subject which is irradiated with first irradiation light;
specifying a second focal position of the optical system with respect to the photographic subject which is irradiated with second irradiation light having characteristics different from characteristics of the first irradiation light;
judging whether or not a first condition based on the first focal position and the second focal position is satisfied;
setting an imaging focal position based on the second focal position in a case in which the first condition is satisfied, and sets an imaging focal position based on the first focal position in a case in which the first condition is not satisfied; and
acquiring an image of the photographic subject irradiated with the second irradiation light, which is captured by an image sensor with the optical system set at the imaging focal position,
wherein the first condition is a condition that is satisfied in a case in which the second focal position is within an acceptable range based on the first focal position, and
wherein the acceptable range is set based on the first focal position and a depth of field corresponding to the first focal position.

20. An imaging apparatus comprising:
the at least one processor configured to perform the imaging control method according to claim 19;
a first light source configured to emit the first irradiation light;
a second light source configured to emit the second irradiation light;
the optical system; and
the image sensor.

* * * * *